(12) United States Patent
Raasch (10) Patent No.: US 8,930,117 B2
(45) Date of Patent: Jan. 6, 2015

(54) HYBRID DRIVE SYSTEM AND METHOD

(75) Inventor: Jason James Raasch, Cedarburg, WI (US)

(73) Assignee: Briggs & Stratton Corporation

( * ) Notice: Subject to any disclaimer, the term of this patent is extended or adjusted under 35 U.S.C. 154(b) by 368 days.

(21) Appl. No.: 13/336,381

(22) Filed: Dec. 23, 2011

(65) Prior Publication Data

US 2013/0166168 A1 Jun. 27, 2013

(51) Int. Cl.
*A01D 34/00* (2006.01)
(52) U.S. Cl.
CPC .................................. *A01D 34/00* (2013.01)
USPC ............................ 701/99; 701/36; 180/53.4
(58) Field of Classification Search
CPC ................................................ B60K 17/356
See application file for complete search history.

(56) References Cited

U.S. PATENT DOCUMENTS

| | | | | |
|---|---|---|---|---|
| 4,246,978 A * | 1/1981 | Schulz et al. | ................ | 180/165 |
| 5,036,667 A * | 8/1991 | Thatcher | ...................... | 60/595 |
| 5,101,925 A * | 4/1992 | Walker | ........................ | 180/243 |
| 6,470,677 B2 * | 10/2002 | Bailey | ............................ | 60/418 |
| 6,551,076 B2 * | 4/2003 | Boulware | ...................... | 417/380 |
| 7,082,759 B1 * | 8/2006 | Tsukamoto et al. | ........... | 60/456 |
| 8,006,796 B1 * | 8/2011 | Fontaine | ...................... | 180/235 |
| 8,104,552 B2 * | 1/2012 | Papke et al. | ................. | 180/6.48 |
| 8,162,621 B2 * | 4/2012 | Walker | ........................ | 417/273 |
| 8,176,838 B2 * | 5/2012 | Walker | ........................ | 91/491 |
| 8,191,342 B2 * | 6/2012 | Ishii et al. | ..................... | 56/11.9 |
| 2001/0001170 A1 * | 5/2001 | Velke et al. | .................... | 56/14.7 |
| 2003/0019682 A1 * | 1/2003 | Schaedler et al. | ........... | 180/308 |
| 2003/0114270 A1 * | 6/2003 | Wuertz et al. | ................. | 477/111 |
| 2005/0050871 A1 * | 3/2005 | Wuertz et al. | ............... | 56/10.2 R |
| 2005/0178599 A1 * | 8/2005 | Sakikawa | ...................... | 180/235 |
| 2008/0029327 A1 * | 2/2008 | Carlson et al. | ................ | 180/242 |
| 2008/0314675 A1 * | 12/2008 | Nozaki et al. | ................ | 180/305 |
| 2009/0193803 A1 * | 8/2009 | Abend et al. | .................... | 60/487 |
| 2009/0236169 A1 * | 9/2009 | Sugimoto et al. | ............ | 180/367 |
| 2009/0271088 A1 * | 10/2009 | Langham | ...................... | 701/102 |
| 2010/0003872 A1 * | 1/2010 | Jessen | ......................... | 440/12.5 |
| 2011/0088384 A1 * | 4/2011 | Smith | ............................ | 60/428 |
| 2011/0232928 A1 * | 9/2011 | Raasch | ......................... | 173/140 |
| 2011/0284310 A1 * | 11/2011 | Abend et al. | ................. | 180/367 |

* cited by examiner

*Primary Examiner* — Jonathan M Dager
(74) *Attorney, Agent, or Firm* — Greenberg Traurig, LLP (57) ABSTRACT

Embodiments of the invention provide a hybrid drive system including a power source. The hybrid drive system can include a hydraulic system operatively coupled to the power source. The hydraulic system can include at least one hydraulic module coupled to the power source and at least one accumulator fluidly coupled to the hydraulic module. The drive system can include at least one drive wheel operatively coupled to the hydraulic system. The drive wheel can be configured and arranged to receive power only from the hydraulic system. The hydraulic system can be configured and arranged to supplement power provided by the power source to the drive wheel. The hybrid drive system can include an electronic control unit in communication with the power source, the hydraulic module, and a sensor associated with the accumulator.

8 Claims, 8 Drawing Sheets

HYBRID DRIVE SYSTEM AND METHOD

BACKGROUND

Some power equipment can consume a significant volume of gasoline and/or other fuels during operations. For example, in order to propel some power equipment, an internal combustion engine can require fuel to provide power to a drive train that, in turn, can provide motive force to the equipment. Gasoline and other fuel costs can be substantial for some pieces of power equipment operated by businesses and consumers. Some manufacturers now provide electric machines, such as permanent magnet motors, within the drive trains, to supplement or eliminate the constant need for internal combustion engine activity. Unfortunately, such electric machines are typically expensive and require expensive batteries for useful operations. In addition, some of these electric machines can lock or limit the power of a conventional internal combustion engine-powered equipment.

SUMMARY

Some embodiments of the invention provide a hybrid drive system that can include a power source. In some embodiments, the power source can be operatively coupled to a hydraulic system. In some embodiment, the hydraulic system can comprise at least one hydraulic module that can be operatively coupled to the power source and at least one accumulator. In some embodiments, the hybrid drive system can include at least one drive wheel that can be operatively coupled to the hydraulic system. In some embodiments, the drive wheel can be configured and arranged to receive driving power only from the hydraulic system. In some embodiments, the hydraulic system can be configured and arranged to supplement power provided by the power source. In some embodiments, the hybrid drive system can include an electronic control unit that can be in communication with at least the power source, the hydraulic module, and the accumulator.

Some embodiments of the invention provide a hybrid drive system comprising a power source that can include a first shaft. In some embodiments, the hybrid drive system can include a hybrid module comprising a second shaft that can be operatively coupled to the first shaft. In some embodiments, the hydraulic module can be configured and arranged to receive a power input from the first shaft and can be configured and arrange to transmit a power output to the first shaft. Some embodiments of the hybrid drive system can comprise a blade system operatively coupled to the first shaft. In some embodiments, the system can comprise an accumulator, a reservoir, and at least one hydraulic motor operatively coupled to at least one drive wheel. In some embodiments, a plurality of hydraulic fluid lines can fluidly couple together the accumulator, the hydraulic module, and the hydraulic motor. In some embodiments, the accumulator and the hydraulic module can be configured and arranged to supplement power provided by the power source to the blade system and the drive wheel. In some embodiments, the hybrid drive system can comprise an electronic control unit in communication with at least the power source, the hydraulic module, and the accumulator.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 1A:
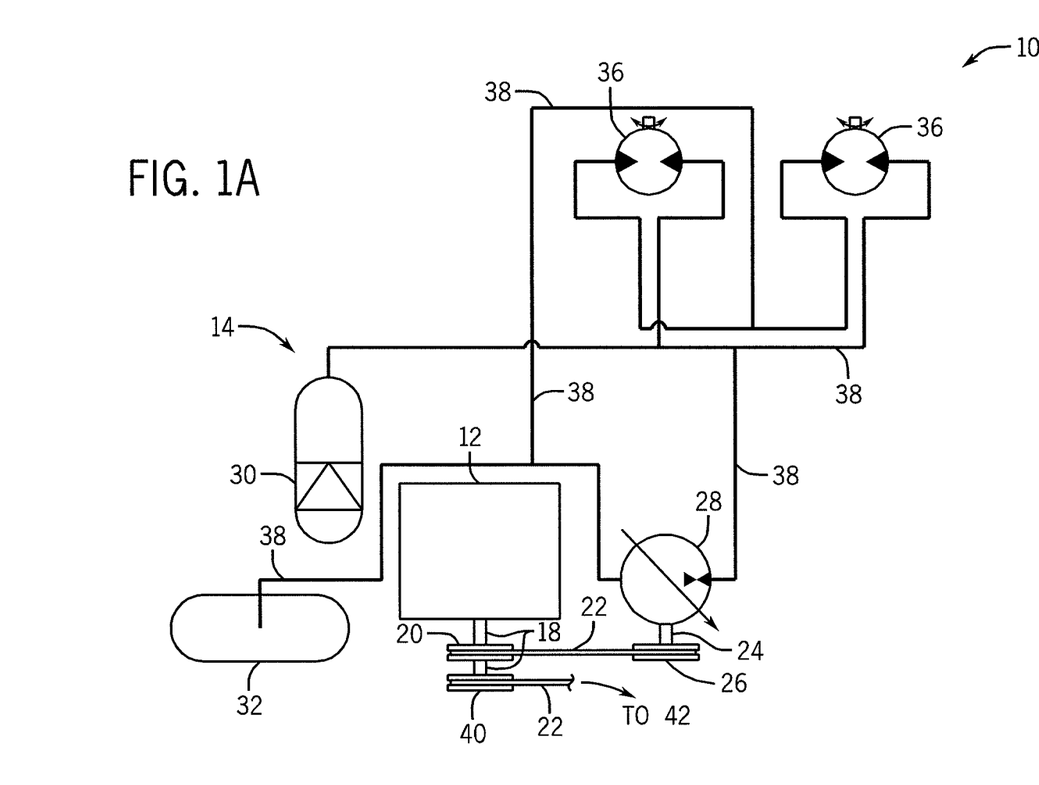
FIG. 1A is a diagram of a hybrid drive system according to one embodiment of the invention.
Figure 1B:
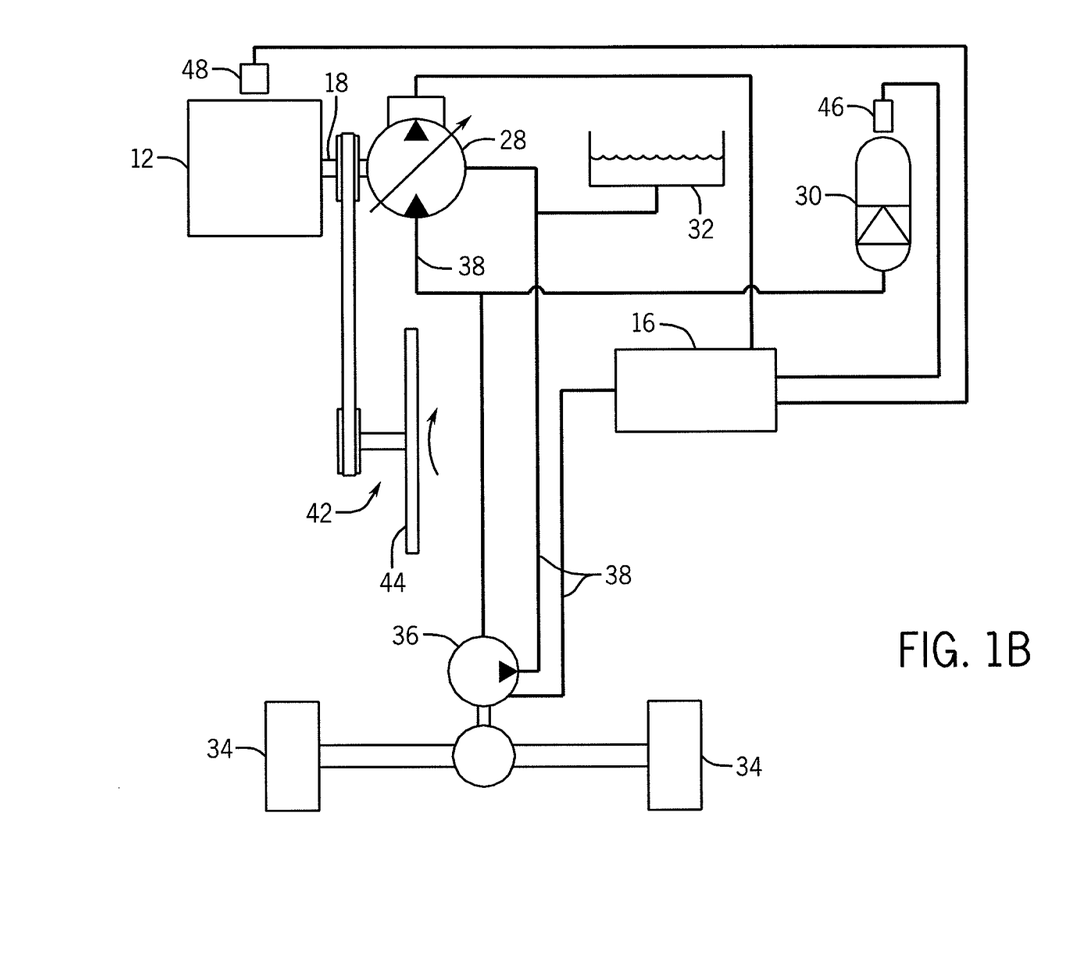
FIG. 1B is a diagram of a hybrid drive system according to one embodiment of the invention.

FIGS. 1A and 1B illustrate a hybrid drive system 10 according to some embodiments of the invention. The hybrid drive system 10 can include a power source 12 coupled to a hydraulic system 14 and an electronic control unit 16. For example, the power source 12 can comprise a conventional internal combustion engine. In some embodiments, the power source 12 can comprise other power sources, such as other types of engines, motors, or other structures that can provide motive force or other forms of energy, power, and/or force. Moreover, the hybrid drive system 10 can comprise more than one power sources 12 (not shown). Additionally, operations of the power source 12 can be at least partially controlled by a conventional power source throttle actuator (not shown) coupled to at least one conventional throttle (not shown) of the power source 12.

Figure 1C:
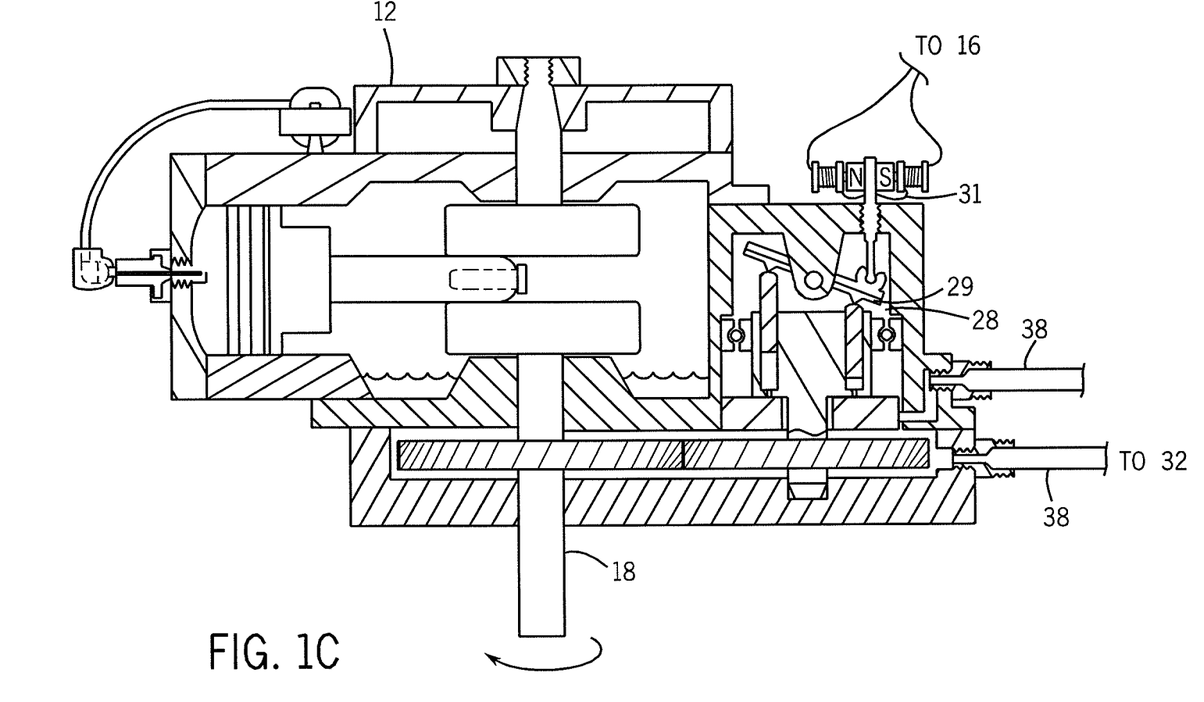
FIG. 1C is a cross-sectional view of a power source with an integral hydraulic module according to one embodiment of the invention.

In some embodiments, the power source 12 can be coupled to the hydraulic system 14. The power source 12 can be configured and arranged to provide power (e.g., torque) or other forms of energy to the hydraulic system 14. For example, the power source 12 can comprise a first shaft 18, as shown in FIGS. 1A-1C. In some embodiments, at least one first pulley 20 can be coupled to the first shaft 18 so that the first pulley 20 and the shaft 18 can substantially synchronously move (e.g., rotate). The first shaft 18 can be configured and arrange to transmit power produced by the power source 12 to at least some other structures of the system 10, as detailed below.

In some embodiments, a power transfer structure 22 can transmit at least a portion of the power produced by the power source 12 to the hydraulic system 14. The power transfer structure 22 can comprise a belt, a chain, a drive shaft, a gear, or other structure configured and arranged to transfer power between the hydraulic system 14 and the first shaft 18. For example, in some embodiments, the hydraulic system 14 can comprise at least a second shaft 24 and a second pulley 26 so that the second pulley 26 substantially synchronously moves with the second shaft 24. As a result, in some embodiments, the power transfer structure 22 can transfer power between the first and second pulleys 20, 26. By way of example only, as the first shaft 18 moves (e.g., due to power provided by the power source 12), it can cause the first pulley 20 to move the power transfer structure 22, which, in turn, can cause the second pulley 26 to move the second shaft 24 or vice versa (i.e. power transfer can occur to and/or from the first shaft 18/first pulley 20 and the second shaft 24/second pulley 26). As a result, power can be transferred between the first and second shafts 18, 24.

The hydraulic system 14 can comprise multiple elements. As shown in FIG. 1A, in some embodiments, the hydraulic system 14 can comprise at least one hydraulic module 28, at least one accumulator 30, and at least one reservoir 32. In some embodiments, the hydraulic module 28 can be in fluid communication with the accumulator 30 and the reservoir 32. For example, the module 28, the accumulator 30, and the reservoir 32 can be fluidly coupled (e.g., by hydraulic fluid lines 38) so that a hydraulic fluid (e.g., water, mineral oil, and/or any other substance capable of functioning as hydraulic fluid) can flow through at least a portion of the hydraulic system 14, as discussed in further detail below.

In some embodiments, the hydraulic module 28 can comprise multiple configurations. In some embodiments, the hydraulic module 28 can be configured and arranged to pump a fluid and/or function as a motor in response to at least a portion of a fluid passing through the module 28. In some embodiments, the module 28 can be configured and arranged to operate as both a pump and a motor. For example, in some embodiments, the module 28 can comprise a hydraulic pump and motor. In some embodiments, the module 28 can comprise a variable-displacement pump/motor, although in some embodiments, the module 28 can comprise a fixed-displacement pump/motor. Moreover, in some embodiments, the module 28 can comprise at least two structures of fixed-displacement or variable-displacement capacity (e.g., one structure configured and arranged to function as a pump and one structure configured and arranged to function as a motor).

As shown in FIG. 1C, the hydraulic module 28 and the power source 12 can comprise alternative configurations. For example, as shown in FIG. 1C, in some embodiments, the hydraulic module 28 can be integral with the power source 12. The module 28 and the power source 12 can comprise the same housing structure so that both elements can be efficiently assembled and installed. For example, by including an integral hydraulic module 28 with the power source 12, costs can be at least partially reduced because of the reduced parts necessary for equipment assembly and maintenance (e.g., few parts that may need future maintenance). Moreover, the integral hydraulic module 28 and power source 12 can also decrease space required within the hybrid drive system 10 so that any equipment comprising the hybrid drive system 10 can be at least partially reduced in size. In some embodiments, the hydraulic module 28 can be coupled to power source 12. For example, the hydraulic module 28 can be bolted to a portion of the power source 12.

In some embodiments, the second shaft 24 can be coupled to the hydraulic module 28. For example, the second shaft 24, including the second pulley 26, can be drivably coupled to the hydraulic module 28 so that power can be transferred between the module 28 and the first shaft 18 via the power transfer structure 22. In some embodiments, as described in further detail below, power can be transferred to and/or from the module 28 and the first shaft 18.

In some embodiments, at least a portion of the power transferred to the hydraulic module 28 from the first shaft 18 can lead to hydraulic fluid movement through portions of the hybrid drive system 10. In some embodiments, the hybrid drive system 10 can comprise at least one drive wheel 34, track, or other driving mechanism coupled to the hydraulic system 14. For example, as shown in FIG. 1B, the hybrid drive system 10 can comprise two or more drive wheels 34 coupled to the hydraulic system 14. The drive wheels 34 can provide motive force for any equipment into which the hybrid drive system 10 is installed. By way of example only, in some embodiments, the system 10 can be installed in power equipment such as a lawn mower, a snow-thrower, a tractor, or other outdoor and indoor power equipment. Furthermore, although future examples relate to elements of a lawn mower, these examples are in no way intended to limit the scope of this invention to lawn mowers and are intended only as exemplary embodiments. As mentioned above, the system 10 can be used in any variety of power equipment or other vehicles (all-terrain vehicles, automobiles, bulldozers, front-end loaders, other vehicles, etc.).

Figure 6:
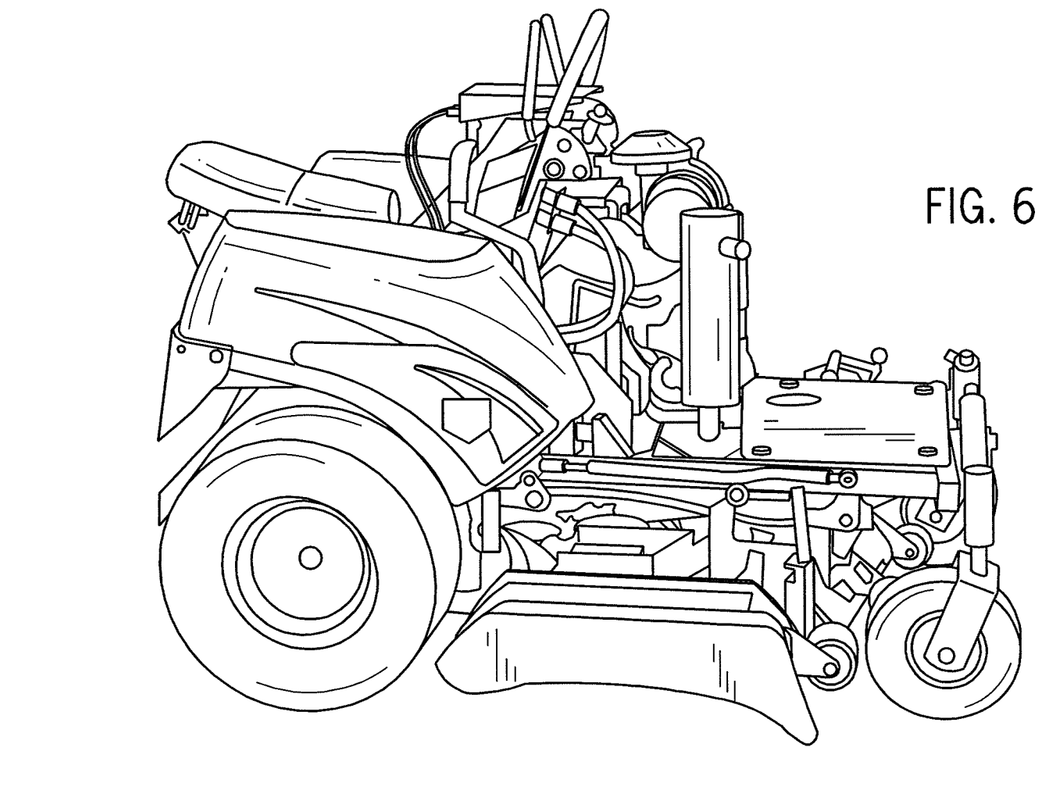
FIG. 6 is a perspective view of zero-turn power equipment according to one embodiment of the invention.

For example, in some embodiments, the power equipment can comprise the drive wheels 34 disposed at a generally rear portion of a frame so that the drive wheels 34 can provide driving force for the equipment to move (e.g., forward, reverse, side-to-side, etc.). Furthermore, the drive wheels 34 and the hybrid drive system 10 can be configured and arranged so that any equipment (e.g., a lawn mower) into which the system 10 is installed can comprise zero-turn radius equipment (e.g., the equipment can execute turns or other changes of directions while requiring little to no space in which to maneuver), such as a zero-turn radius lawn mower, as shown in FIG. 6.

In some embodiments, movement of the drive wheels 34 can be at least partially driven by one or more hydraulic motors 36. The hydraulic system 14 can comprise at least one hydraulic motor 36 coupled to at least one drive wheel 34 (e.g., one or more hydraulic motors 36 can be fluidly coupled to the hydraulic system 14). For example, the hybrid drive system 10 can comprise two drive wheels 34 with a hydraulic motor 36 coupled to each of the wheels 34, although more than one motor 36 can be coupled to each wheel 34. Moreover, in some embodiments, a single hydraulic motor 36 can be coupled to both wheels 34, as shown in FIG. 1B.

In some embodiments, at least a portion of the hydraulic fluid can circulate through the hydraulic system 14 to generate power that can be eventually transferred to the drive wheels 34 and/or a blade system 42, as discussed below. In some embodiments, the power received by the second shaft 24 (e.g., via the first shaft 18) can cause the hydraulic module 28 to draw at least a portion of the hydraulic fluid from the reservoir 32 and distribute portions of the fluid throughout the hydraulic system 14. For example, as shown in FIGS. 1A and 1B, the hydraulic module 28 can circulate (e.g., pump) hydraulic fluid through the hydraulic system 14 via the plurality of hydraulic lines 38 (e.g., hoses, pipes, or other conventional structures capable of containing and guiding at least a portion of the hydraulic fluid through some portions of the hydraulic system 14).

Moreover, in some embodiments, as a result of circulating through the hydraulic lines 38, at least a portion of the hydraulic fluid can transfer power from the hydraulic module 28 to the drive wheels 34. For example, as illustrated in FIGS. 1A and 1B, when the module 28 functions as a pump, at least a portion of the hydraulic fluid can circulate through the hydraulic lines 38 (e.g., from the reservoir 32) and through the hydraulic motors 36 coupled to the wheels 34. As a result of the hydraulic fluid passing through the motors 36, mechanical energy can be generated by the motors 36 that can cause the drive wheels 36 to move (e.g., to move the equipment into which the system 10 is installed).

In some embodiments, the hydraulic system 14 can comprise other configurations to provide power to the drive wheels 34. In some embodiments, the hybrid drive system 10 can comprise a conventional drive train (not shown). For example, the system 10 can comprise a conventional drive train (e.g., a transmission and axle or transaxle as well as an optional differential case and carrier) coupled to the hydraulic system 14 and at least one of the drive wheels 34. As a result, the hybrid drive system 10 can provide power to the conventional drive train, which can, in turn, provide power to at least one of the wheels 34. Moreover, in some embodiments, at least one of the wheels 34 can be coupled to the conventional drive train and at least one of the wheels 34 can be coupled to at least one hydraulic motor 36.

In some embodiments, the hydraulic motor 36 can comprise multiple configurations. In some embodiments, the hydraulic motor 36 can be configured and arranged to function as both a motor and a pump or the motor 36 can comprise both a pump and a motor (e.g., substantially similar to the hydraulic module 28). For example, as some pieces of power equipment operate where little to no drive force is necessary to be provided to one or more of the drive wheels 34 (e.g., the power equipment is moving down a hill or other terrain in which gravity can function as the driving force for the equipment, which can be known as "free-wheeling"), the movement of the drive wheels 34 can cause the hydraulic motors 36 to operate in a pumping capacity (e.g., in addition to or in lieu of operating in a motor capacity) so that the hydraulic motors 36 can also circulate hydraulic fluid through the hydraulic system 14. As a result, hydraulic fluid can be circulate to the accumulator 30 and through the module 28 and can regenerate some or all of the power required to drive the motors 36 and the wheels, 34.

In some embodiments, the hydraulic module 28 can be fluidly coupled to the accumulator 30 via one or more hydraulic lines 38. As shown in FIGS. 1A and 1B, in addition to being fluidly coupled to the hydraulic motors 36 and/or the conventional drive train, the hydraulic module 28 can circulate (e.g., pump) hydraulic fluid from the hydraulic system 14 (e.g., originating from the reservoir 30 or other portions of the hydraulic system 14) to the accumulator 30. In some embodiments, the accumulator 30 can comprise bladder or piston and cylinder configuration containing a compressible substance (e.g., a compressible gas, such as nitrogen) and/or a spring-loaded piston. The accumulator 30 can receive a portion of the hydraulic fluid and the compressible substance can be compressed by the influx of the fluid in a conventional manner. The accumulator 30 can continue to receive hydraulic fluid until reaching its maximum capacity. Moreover, the accumulator 30 can be in communication (e.g., wired or wireless communication) with a user interface (not shown) so that the user operating the equipment into which the system 10 is installed can view the capacity of the accumulator 30. For example, the user interface can comprise a conventional pressure gauge-like structure that conveys the amount of pressure present within the accumulator 30 (e.g., due to the volume of fluid stored in the accumulator 30) and can convey the pressure in a color-coded configuration, a metered configuration, or other configurations that can enable the user to readily determine the pressure level within the accumulator 30.

As shown in FIGS. 1A and 1B, the power source 12 can transfer power to elements other than the hydraulic module 28. For example, in some embodiments, the first shaft 18 can comprise a third pulley 40 and can transfer power to the blade system 42. By way of example only and as previously mentioned, the system 10 can be installed in a lawn mower and the power source 12 can provide power to the blade system 42 for use in cutting grass or other vegetation. In some embodiments, as a result of a power transfer structure 22 being disposed between the third pulley 40 and the blade system 42, power can be transferred to blades 44 of the blade system 42 to move the blades 44 for trimming and/or removal of vegetation. As a result, in some embodiments, the equipment can both move as a result of the hydraulic module 28 and trim vegetation as a result of the power provided to the blades 44 by the power source 12. As discussed below, in some embodiments, the hydraulic module 28 can also provide power to the conventional blade system 42. Additionally, the hybrid drive system 10 can comprise a hydraulic motor (not shown) operatively coupled to the hydraulic fluid lines 38 and the blade system 42 so that movement of the hydraulic fluid through the hydraulic system 14 can also provide power to the blade system 42.

In some embodiments, the hydraulic module 28 can distribute at least a portion of the hydraulic fluid to the accumulator 30 when operating under low-load conditions. For example, when the power equipment is operating under conditions where not all of the power provided by the power source 12 to the module 28 is required by the drive wheels 34 or blade system 42, at least a portion of the hydraulic fluid can be directed to the accumulator 30 and stored for later use. Moreover, in some embodiments, regardless of load conditions, the module 28 can circulate at least a portion of the hydraulic fluid to the accumulator 30 so that it can be stored for use when needed (e.g., to supplement the power provided by the power source 12).

In some embodiments, the accumulated hydraulic fluid within the accumulator 30 can function to supplement the power provided through the hydraulic module 28. For example, the power originating from the power source 12 may be insufficient to power the drive wheels 34 and/or the blade system 42. By way of further example, under some circumstances, the power source 12 can be outputting a maximum amount of power (e.g., the power equipment is moving up a steeply inclined surface) and the user can attempt to engage the blade system 42. Although the power source 12 may not be apply to supply sufficient power, some or all of the hydraulic fluid stored within the accumulator 30 can be released to power the drive wheels 34 and/or the blade system 42 (e.g., temporarily until the equipment returns to a substantially flat surface and/or until the user is done using the blade system 42). As another example, the accumulator 30 release some or all of the stored hydraulic fluid if the blade system 42 encounters thick and/or wet vegetation that is difficult to cut and/or trim.

In some embodiments, the accumulator 30 can release at least a portion of the stored hydraulic fluid, which can result in further hydraulic fluid circulating through the hydraulic lines 38 to supplement or replace hydraulic fluid being pumped by the module 28. Moreover, the accumulator 30 can release at least a portion of the stored hydraulic fluid to propel the hydraulic module 28 (e.g., when the module 28 operates as a hydraulic motor), and, accordingly, produce mechanical energy to supplement and/or replace energy produced by the power source 12 (e.g., provide power to one or more of the drive wheels 34 and/or the blade system 42).

In some embodiments, at least a portion of the accumulated hydraulic fluid within the accumulator 30 can function to supplement and/or replace the power source 12. For example, as previously mentioned, the power source 12 can comprise an internal combustion engine that operates, at least in part, on a petroleum-based fuel source. On some occasions, the power source 12 may run low or run out of fuel. In some embodiments, at least a portion of the hydraulic fluid accumulated within the accumulator 30 that can be released to flow through the hydraulic lines 38 can provide power to the drive wheels 34 (e.g., via the hydraulic motors 36) when the power source 12 runs low or runs out of fuel.

In some embodiments, at least one flow control valve (not shown) can be disposed along the hydraulic lines 38 connecting the hydraulic system 14 and the hydraulic module 28. For example, the module 28 can comprise a pump and/or motor that may function without the ability to regulate volumes of hydraulic fluid influx and efflux. Accordingly, the flow control valve can regulate the flow of the hydraulic fluid to and from the hydraulic module 28 to ensure proper hydraulic fluid flow. For example, the flow control valve can comprise an electronic servo motor and/or a solenoid so that the position of the valve can be adjusted via a current sent from the electronic control unit 16 to the valve (e.g., via pulse-width modulation).

In some embodiments, the blade system 42 can function to at least partially charge or recharge the accumulator 30. In some conventional power equipment comprising a blade system and a power source, deactivation (i.e., stopping) of the blade system can be achieved via a conventional friction brake. In some embodiments, the blade system 42 can be coupled to the hydraulic system 14 so that braking of the blade system 42 can at least partially charge or recharge the accumulator 30 (e.g., the hybrid drive system 10 can comprise regenerative braking capabilities). For example, the blade system 42 can be coupled to the hydraulic module 28 via a power transfer structure 22. Additionally, in some embodiments, the coupling between the hydraulic module 28 and the power source 12 can be engaged and disengaged to enable or disable power transfer, respectively. Accordingly, when an operator provides a deactivation signal for the blade system 42, the hydraulic module 28 and the power source 12 can be decoupled via a clutch and the hydraulic module 28 can function as a pump to capture at least a portion of the kinetic energy released by the blade system's 42 deactivation, which can lead to deceleration of the blade system 42 and charging of the accumulator 30.

Furthermore, in some embodiments, the hydraulic module 28 can comprise a variable-displacement pump and motor that includes a wobble plate 29, as shown in FIG. 1C. In some embodiments, at least one motor 31 (e.g., a servo motor or other similar motor) can be operatively coupled to the wobble plate 29 and/or other portions of the hydraulic module 28 and can be in communication with the electronic control unit 16. For instance, the motor 31 can be configured and arranged to change an angle of the wobble plate 29, which can vary the amount of hydraulic fluid passing through the module 28. Moreover, in some embodiments, the wobble plate 29 can be configured and arranged so that the angle can reach substantially zero degrees, in which case the hydraulic module 28 can be substantially sealed relative to the hydraulic system 14. Additionally, in some embodiments, the wobble plate 29 can be configured and arranged to enable hydraulic fluid flow in both directions (e.g., when the hydraulic module 28 operates as a pump or a motor). In some embodiments, the flow control valve can be used in lieu of, or together with, a hydraulic module 28 comprising a variable wobble plate.

Moreover, in some embodiments, as previously mentioned, the hydraulic module 28 can also function as a hydraulic motor. For instance, in some embodiments, hydraulic fluid can circulate through the module 28 from the accumulator 30 and the module 28 can operate as a motor to generate power via the second shaft 24. Moreover, in some embodiments, the second shaft 24 can be coupled to the hydraulic module 28 via a clutch or a structure that can enable the second shaft 24 to operate to receive power from the first shaft 18 and to transmit power to the first shaft 18 (e.g., via the power transfer structures 22). As a result, as hydraulic fluid passes through the hydraulic module 28 when it operates as a motor, the hydraulic module 28 can turn the second shaft 24 and the second pulley 26, which can, in turn, transfer power to the first shaft 18 and first pulley 20. Moreover, by transferring power to the first shaft 18, at least some elements of the equipment that are coupled to the shaft 18, such as the blade system 42, can receive power that is supplemented by or replaced by the power provided by the hydraulic module 28 and hydraulic fluid from the accumulator 30. Accordingly, when further power is needed by the equipment (e.g., when the user engages the blade system 42, the user is hauling a load, the user is operating the equipment on a challenging terrain, etc.), the hydraulic system 14, via the accumulator 30 and the hydraulic module 28, can supplement and/or replace the power provided by the power source 12 to improve operations of the hybrid drive system 10 and the equipment in which the system 10 is installed (e.g., the hydraulic system 14 can "boost" the amount of energy available to the hybrid drive system 10).

In some embodiments, the hydraulic module 28 can be configured and arranged to function as a starter for the power source 12. For example, at least one of the first shaft 18, the second shaft 24, the first pulley 20, and/or the second pulley 26 can comprise a one-way clutch (e.g. a sprag clutch) that can enable hydraulic module 28 to transfer power to the power source 12 via the first shaft 18.

In some embodiments, by causing movement of the first shaft 18, the hydraulic module 28 can cause the power source 12 to rotate and ultimately start. The hydraulic fluid exiting the accumulator 30 and flowing through the hydraulic system 14 and the hydraulic module 28 can at least partially drive the starting of the power source 12. A conventional recoil starter can be provided to start the power source 12 if the accumulator 30 is discharged and a conventional electric starter is not included in the system 10 or is inoperable.

Furthermore, as discussed in further detail below, in some embodiments, by supplementing and/or replacing power being created by the power source 12 with power from the accumulator 30 and the hydraulic module 28, the hybrid drive system 10 can comprise a power source 12 that includes a lesser output capacity (e.g., a lesser horsepower rating)

because of the capabilities of the hydraulic module 28. As a result, the power source 12 can generally operate substantially within an efficient range (e.g., near or at its highest load capacity) and can then be supplemented with power from the hydraulic system 14 as needed.

Figure 2:
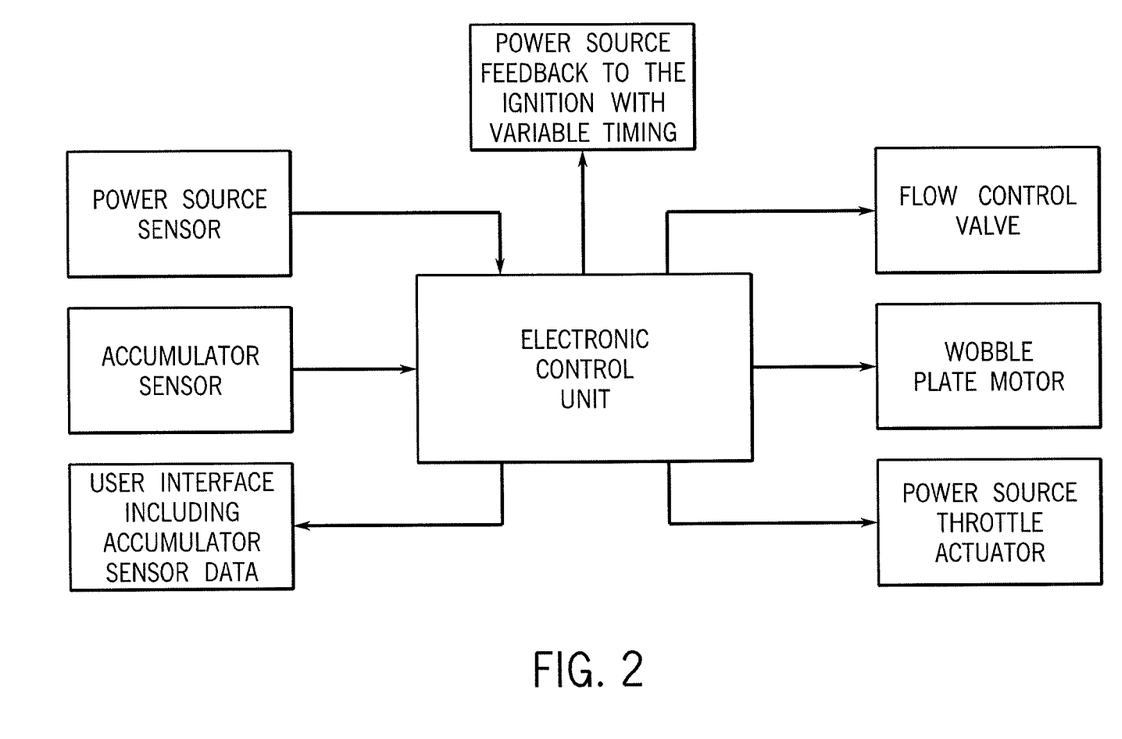
FIG. 2 is a diagram of an electronic control unit according to one embodiments of the invention.
Figure 3:
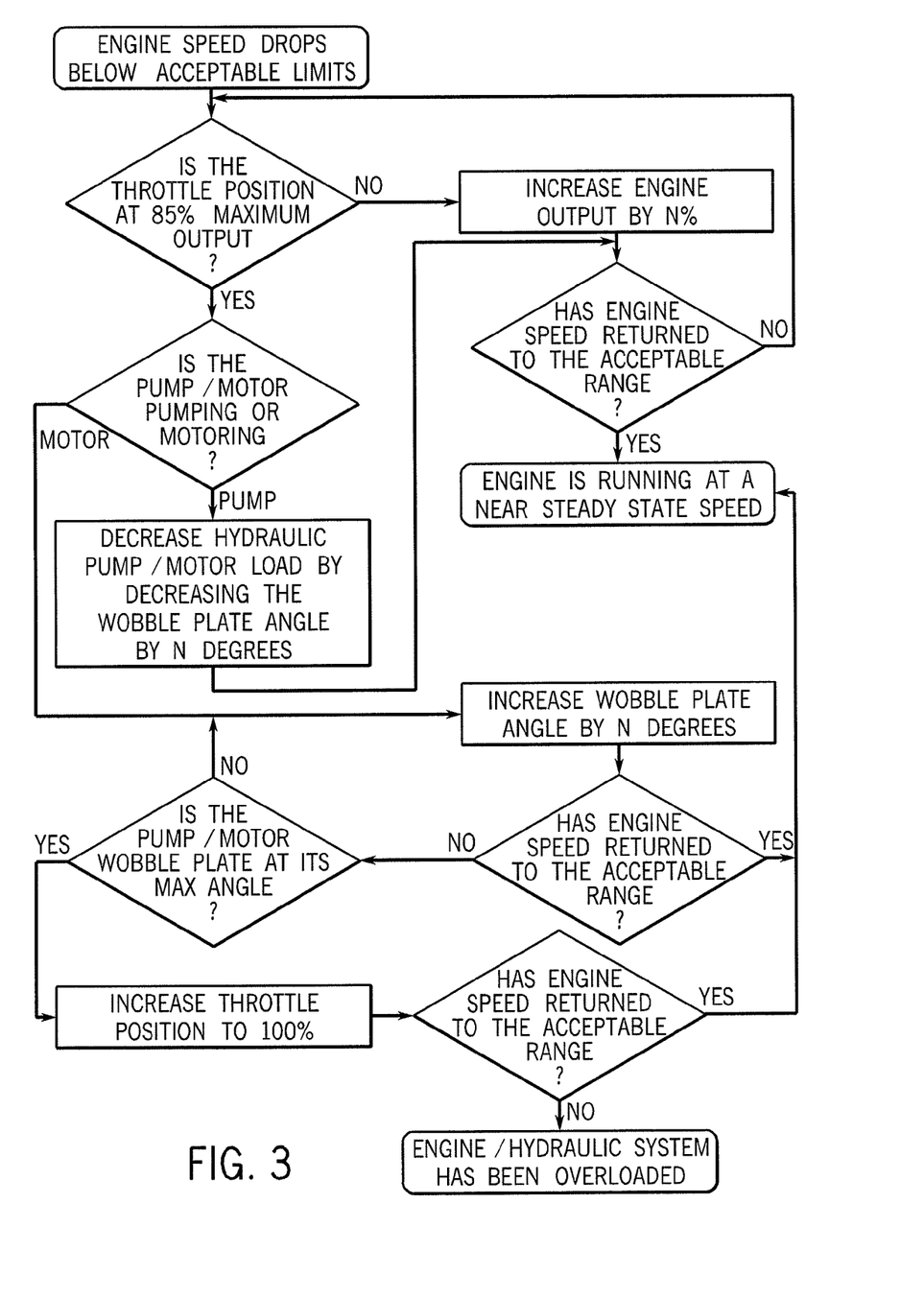
FIG. 3 is a logic chart detailing some operational logic of the electronic control unit of FIG. 2.
Figure 4:
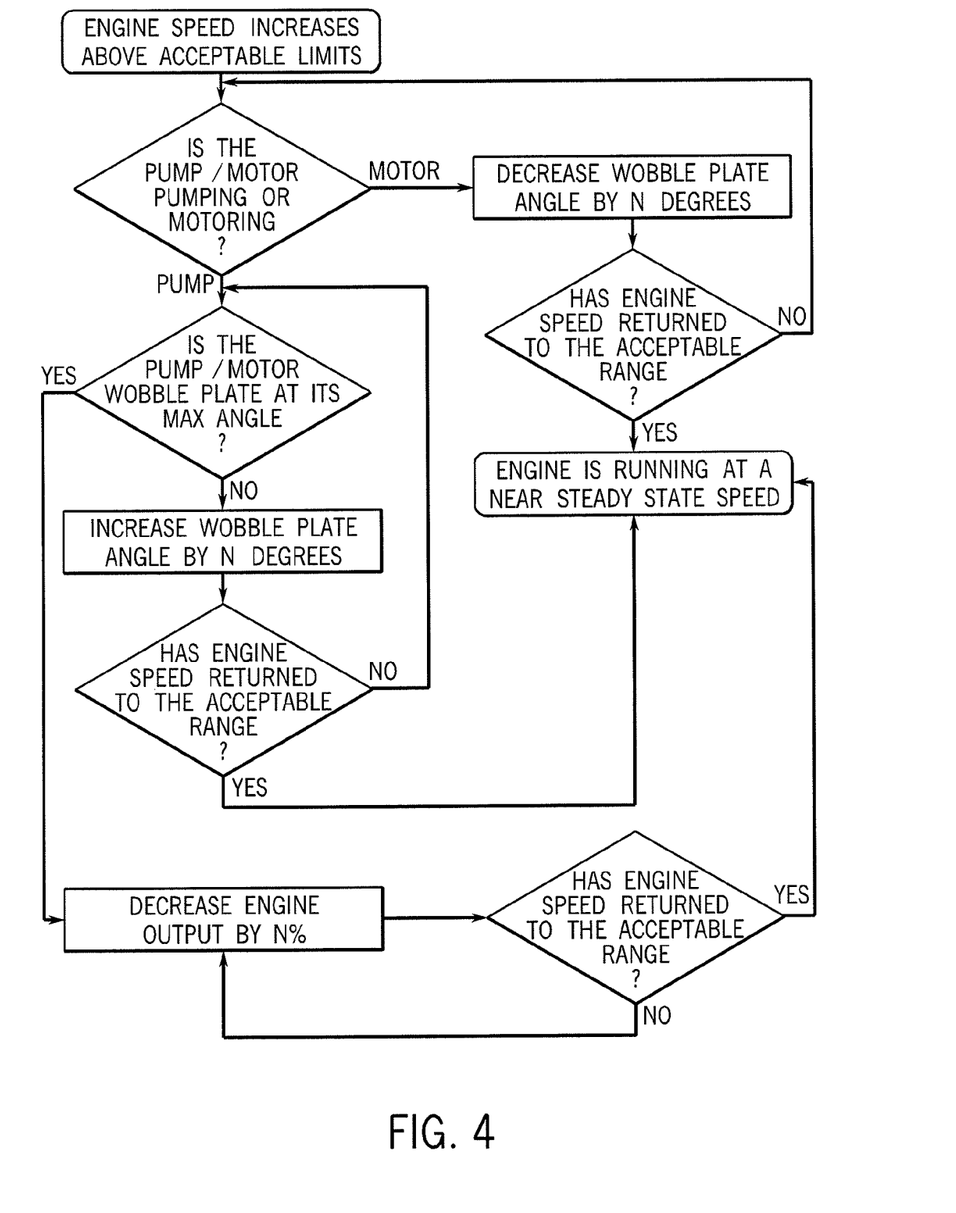
FIG. 4 is a logic chart detailing some operational logic of the electronic control unit of FIG. 2.

As shown in FIGS. 2-4, in some embodiments, the electronic control unit 16 can at least partially direct operations of the hybrid drive system 10 via input from sensors. One or more sensors can be wired and/or wirelessly connected to the electronic control unit 16. For example, as shown in FIGS. 1-2, the hybrid drive system 10 can comprise at least one accumulator sensor 46 and at least one power source sensor 48. In some embodiments, the electronic control unit 16 can receive data sensed by the accumulator sensor 46 to assess its status (e.g., percent of total capacity for the accumulator 30), can process the data, and can transmit the current status (e.g., via wired or wireless communications) to the user interface. Moreover, in some embodiments, the electronic control unit 16 can receive data from the power source sensor 48 to assess the current state of the power source 12 (e.g., operational speed of the power source 12, current status of the power source throttle actuator, and other indicia of the current status of, and current load placed on, the power source 12).

In some embodiments, the electronic control unit 16 can at least partially control portions of the hybrid drive system 10. As represented in FIG. 2, the electronic control unit 16 can process the data received from the accumulator sensor 46 and the power source sensor 48 and control operations of other elements. For example, the electronic control unit 16 can control operations of the flow control valve of the hydraulic module 28, the wobble plate motor 31, the power source throttle actuator, and/or other elements of the system 10.

The following discussion of logic steps of the electronic control unit 16 is intended only as an example and is not intended to limit the scope of this disclosure. Different, alternative steps in the logic employed by the electronic control unit 16 can be used to achieve manufacturer or user needs. Additionally, although references in the following disclosure are to "the wobble plate" of the hydraulic module 28, as previously mentioned, in some embodiments, the hydraulic module 28 can comprise a flow control valve in addition to, or in lieu of, the wobble plate 29 and the wobble plate motor 31.

Referring to FIG. 3, in some embodiments, the electronic control unit 16 can adjust operations of the drive system 10 when it senses that the hybrid drive system 10 is not producing enough power to meet the needs of the equipment (e.g., the user is engaging the blade system 42 or driving a large load). As shown in FIG. 3, in some embodiments, the electronic control unit 16 can initially assess the position of the throttle with respect to a maximum position of the throttle of the power source 12. For instance, as shown in FIG. 3, if the throttle is not yet positioned at 85% of its maximum (e.g., as conveyed by the power source sensor 48), the electronic control unit 16 can transmit instructions to the power source 12 to increase output by N % (e.g., N can comprise a percentage greater than zero, such as 0.1%, 1%, 5%, 10%, etc.). After the increase by N %, the electronic control unit 16 can then assess whether the hybrid drive system 10 output has reached acceptable levels. If it has, the hybrid drive system 10 can continue to operate under its increased output conditions. If the hybrid drive system 10 output has not reached acceptable levels, the previously mentioned increase in power source output can repeat until the power source 12 operates at 85% of its maximum output. Although 85% of the power source's 12 maximum is used for an illustration in this embodiment, other percentages (e.g., 50%, 75%, 90%, 99%, etc.) can be used for analysis by the electronic control unit 16.

In some embodiments, if the power source 12 is operating at a near maximum output and the hybrid drive system 10 is still not producing enough power, the electronic control unit 16 can modulate operations of other portions of the system 10. As shown in FIG. 3, if further changes to the operations are necessary, the electronic control unit 16 can initially determine if the hydraulic module 28 is operating in a pump and/or in a motor capacity. If the module 28 is at least partially functioning as a pump, the electronic control unit 16 can signal to the wobble plate motor 31 to decrease the wobble plate 29 angle (e.g., decrease the pumps load on the power source 12) by N degrees (e.g., 0.1 degrees, 1 degree, 5 degrees, 10 degrees, etc.). After decreasing the angle of the wobble plate 29, in some embodiments, the electronic control unit 16 can assess whether the hybrid drive system's 10 output has increased to acceptable levels. If the output of the power source 12 has not yet increased to acceptable levels, the angle can be repeatedly further decreased by N degrees until the output of the hybrid drive system 10 is within acceptable levels.

In some embodiments, the electronic control unit 16 can also modulate operations of the hydraulic module 28 if the module 28 is at least partially operating as a motor. As shown in FIG. 3, if the hydraulic module 28 is at least partially operating as a motor and further output is necessary, the electronic control unit 16 can transmit a signal to the wobble plate motor 31 to increase the angle of the wobble plate 29 (e.g., increase output by the hydraulic module 28) by N degrees (e.g., 0.1 degrees, 1 degree, 5 degrees, 10 degrees, etc.), which can lead to receiving more hydraulic fluid from portions of the hydraulic system 14, such as the accumulator 30. The electronic control unit 16 can reassess whether the output is within acceptable levels, and, if not, the wobble plate 29 angle can continue to be increased by N degrees to increase hydraulic module 28 output until the wobble plate 29 angle is at a maximum. In some embodiments, if the angle of the wobble plate 29 is at a maximum and the output continues to fall under acceptable levels, power source 12 output can be increased to a maximum and then the output level can be assessed. If the output still falls under the needed output, the system 10 will be substantially or completely overloaded and the user will have to adjust their operations of the system 10 and the power equipment.

In some embodiments, the electronic control unit 16 can also modulate operations of the hybrid drive system 10 if it determines that the output exceeds levels required by equipment operations. Referring to FIG. 4, if the electronic control unit 16 determines that the output levels of the system 10 are too great, the unit 16 can initially determine whether the hydraulic module 28 is operating as a pump and/or a motor. In some embodiments, if the hydraulic module 28 is operating as a motor, the electronic control unit 16 can transmit instructions to the wobble plate motor 31 to decrease the wobble plate 29 angle (e.g., decrease the output by the hydraulic module 28) by N degrees (e.g., 0.1 degrees, 1 degree, 5 degrees, 10 degrees, etc.). After adjusting the wobble plate 29 angle, the electronic control unit 16 can reassess the output of the system 10, and if still too great, the previous step of reducing the angle by N degrees can be repeated until levels of system 10 output reach acceptable levels (e.g., the output of the hydraulic module 28 can continue to be reduced until there is no output from the module 28).

Furthermore, if the hydraulic module 28 is operating as a pump, the electronic control unit 16 can transmit instructions to the wobble plate motor 31 to increase the wobble plate 29 angle by N degrees (e.g., 0.1 degrees, 1 degree, 5 degrees, 10 degrees, etc.), if the angle is not already at its maximum. As a result of increasing the wobble plate 29 angle when the hydraulic module 28 is operating as a pump, further amounts of hydraulic fluid can circulate through the module 28, which can lead to charging of the accumulator 30. After adjusting the wobble plate 29 angle, the electronic control unit 16 can reassess the output of the system 10, and if still too great, the previous step of reducing the angle by N degrees can be repeated until levels of system 10 output reach acceptable levels or until the wobble plate angle reaches a maximum. If the wobble plate angle reaches a maximum, the electronic control unit 16 can signal to the power source 12 to reduce output by N % (e.g., N can comprise an percentage greater than zero, such as 0.1%, 1%, 5%, 10%, etc.). After adjusting the output of hydraulic module 28, the electronic control unit 16 can reassess the output of the system 10, and if still too great, the previous step of reducing the output by N % can be repeated until levels of system 10 output reach acceptable levels.

As shown in FIG. 2, in some embodiments, electronic control unit 16 can transmit instructions to an ignition system for the power source 12. Moreover, in some embodiments, the ignition system can be configured and arranged so that a timing setting of the ignition can be varied by the electronic control unit 16. In some embodiments, if the electronic control unit 16 determines that throttle position and rotational speed of the power source 12 is greater than necessary and the accumulator 30 is at a maximum capacity, the electronic control unit 16 can signal to the ignition system to adjust the ignition timing so that maximum fuel economy can be achieved.

In some embodiments, some portions of the hybrid drive system 10 can offer advantages over some conventional power equipment drive systems. For example, some conventional drive systems may rely heavily and/or solely upon a power source (e.g., an internal combustion engine) for providing power to the wheels and other elements (e.g., a blade system or other power-requiring elements). Many conventional drive systems, however, require larger power sources for the few occasions where a maximum amount of power is required (e.g., when the blade system is engaged, the equipment is hauling a sizable load, the equipment is operating in difficult terrain, etc.), but rarely need to expend the maximum amount of power. As a result, at least some of these systems exhibit relatively poor fuel efficiency because of the time spent operating at inefficient output conditions. Accordingly, as previously mentioned, the power source 12 can comprise a lesser horsepower value relative to at least some conventional power sources. As a result, in some embodiments, the power source 12 can operate at or substantially close to its maximum output, increasing efficiency and reducing power wasted during routine operations. Moreover, in some embodiments, the hydraulic system 14 can function to supplement the power source 12 when increased power requirements are placed upon the power equipment. As a result, the reduced-output power source 12 can consume reduced amounts of fuel, which reduces costs associated with operations of the power equipment.

Figure 5:
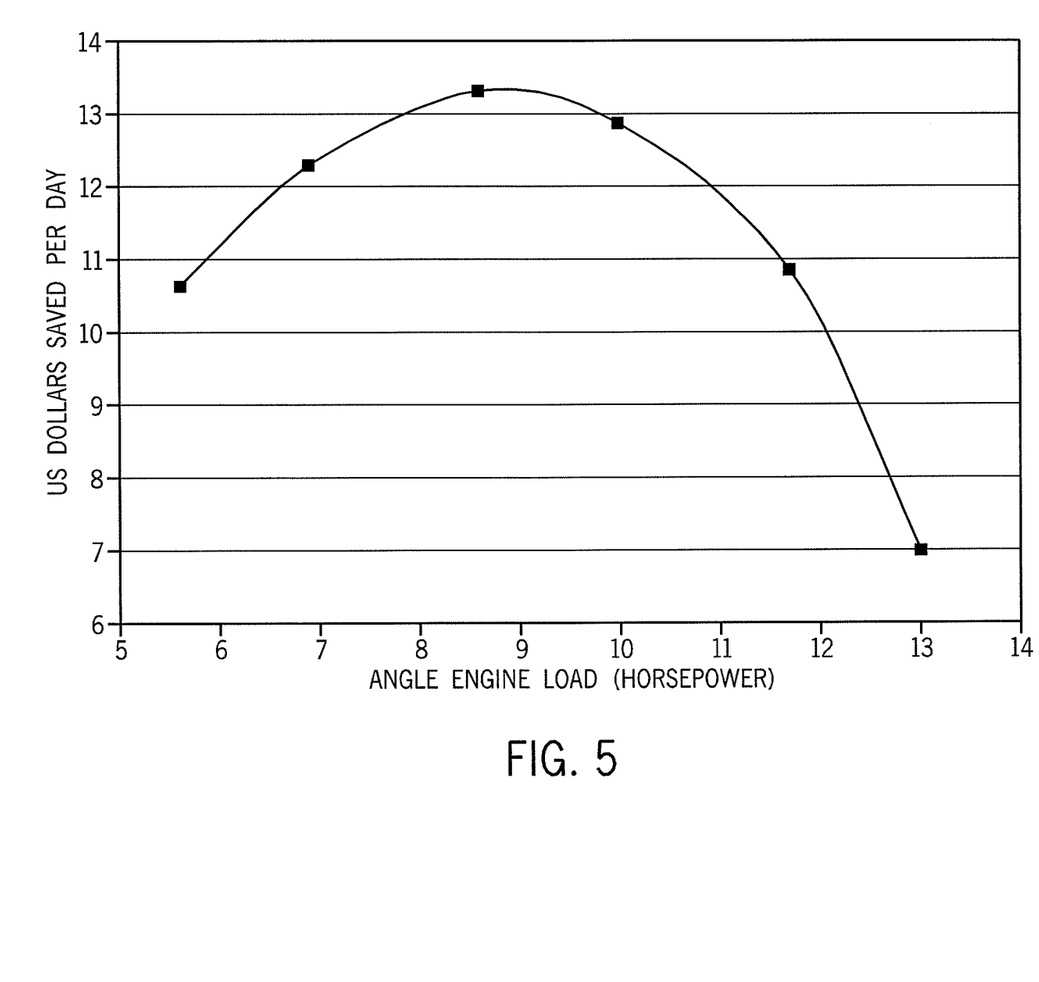
FIG. 5 is a graph representing data regarding fuel usage by some embodiments of the invention.

The following example is only for purposes of illustrating the potential impact of some embodiments of the invention on fuel consumption by some power equipment and is not intended to limit the scope of this disclosure. In some embodiments, the reduced costs can be seen in some commercially-used power equipment. For example, as represented by the graph shown in FIG. 5, use of a smaller power source 12 (e.g., relative to some conventional power sources) in combination with a hydraulic system 14 can result in reduced fuel costs, especially for power equipment users that employ the equipment for extended periods (e.g., eight hours per day), such as lawn-maintenance professionals. As shown in FIG. 5, by employing some embodiments of the invention, fuel expense savings between seven and thirteen dollars per day can be achieved when comparing some embodiments of the invention to some conventional power sources. Moreover, by reducing fuel consumed, fewer combustion byproducts (e.g., carbon dioxide) can be released by the power equipment.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A hybrid drive system for a zero-turn radius piece of power equipment, the hybrid drive system comprising
   a power source comprising a first shaft;
   a hydraulic module comprising a second shaft, the second shaft operatively coupled to the first shaft, and wherein the hydraulic module is configured and arranged to receive a power input from the first shaft and further configured and arranged to transmit a power output to the first shaft;
   a blade system operatively coupled to the first shaft;
   an accumulator;
   at least one hydraulic motor operatively coupled to at least one drive wheel, the at least one drive wheel being configured and arranged to execute zero-radius turning;
   a plurality of hydraulic fluid lines fluidly coupling together at least the accumulator, the at least one hydraulic motor, and the hydraulic module, and wherein the accumulator and the hydraulic module are configured and arranged to supplement power provided by the power source to one or more of the blade system and the at least one drive wheel; and
   an electronic control unit in communication with at least the power source, the hydraulic module, and a sensor associated with the accumulator.

2. The hybrid drive system of claim 1, wherein the hydraulic module is configured and arranged to operate as a hydraulic motor and a pump.

3. The hybrid drive system of claim 2, wherein the hydraulic module is configured and arranged to provide driving power to the at least one drive wheel and to provide power to the blade system via the first shaft.

4. The hybrid drive system of claim 1, wherein the hydraulic module comprises at least one wobble plate in communication with the electronic control unit.

5. The hybrid drive system of claim 1, and further comprising at least two drive wheels coupled to at least two hydraulic motors.

6. The hybrid drive system of claim 5, where in the at least two drive wheels comprise a zero-turn radius configuration.

7. The hybrid drive system of claim 1 and further comprising at least one power source sensor disposed substantially adjacent to the power source and in communication with the power source and the electronic control unit.

8. The hybrid drive system of claim 1 and further comprising at least one accumulator sensor in communication with the at least one accumulator and the electronic control unit.

* * * * *